(12) United States Patent
Degler et al.

(10) Patent No.: US 8,161,739 B2
(45) Date of Patent: Apr. 24, 2012

(54) FORCE TRANSMISSION DEVICE IN PARTICULAR FOR POWER TRANSMISSION BETWEEN A DRIVE ENGINE AND AN OUTPUT

(75) Inventors: Mario Degler, Baden-Baden (DE); Thorsten Krause, Bühl (DE); Kai Schenck, Offenburg (DE); Markus Werner, Bühl (DE); Dominique Engelmann, Offendorf (FR)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 12/800,937

(22) Filed: May 26, 2010

(65) Prior Publication Data

US 2010/0236228 A1 Sep. 23, 2010

Related U.S. Application Data

(63) Continuation of application No. PCT/DE2008/001900, filed on Nov. 17, 2008.

(30) Foreign Application Priority Data

Nov. 29, 2007 (DE) .......................... 10 2007 057 448

(51) Int. Cl.
*F16D 3/14* (2006.01)
*F16F 15/10* (2006.01)
(52) U.S. Cl. ........................................ 60/338; 192/30 V
(58) Field of Classification Search .................... 60/338; 192/30 V
See application file for complete search history.

(56) References Cited

U.S. PATENT DOCUMENTS 6,026,940 A * 2/2000 Sudau .......................... 192/3.28

FOREIGN PATENT DOCUMENTS

| DE | 198 04 227 A1 | 8/1999 |
| DE | 10 2006 028 556 A1 | 1/2007 |
| EP | 1744074 A2 * | 1/2007 |
| GB | 2 186 054 A | 8/1987 |
| JP | 63 251644 A | 10/1988 |

* cited by examiner

*Primary Examiner* — Thomas E Lazo
(74) *Attorney, Agent, or Firm* — Von Rohrscheidt Patent

(57) ABSTRACT

A force transmission device, in particular or power transmission between a drive engine and an output, comprising a damper assembly with at least two dampers, which can be connected in series, and a rotational speed adaptive absorber, wherein the rotational speed adaptive tuned mass damper is disposed between the dampers at least in one force flow direction through the force transmission device.

29 Claims, 7 Drawing Sheets

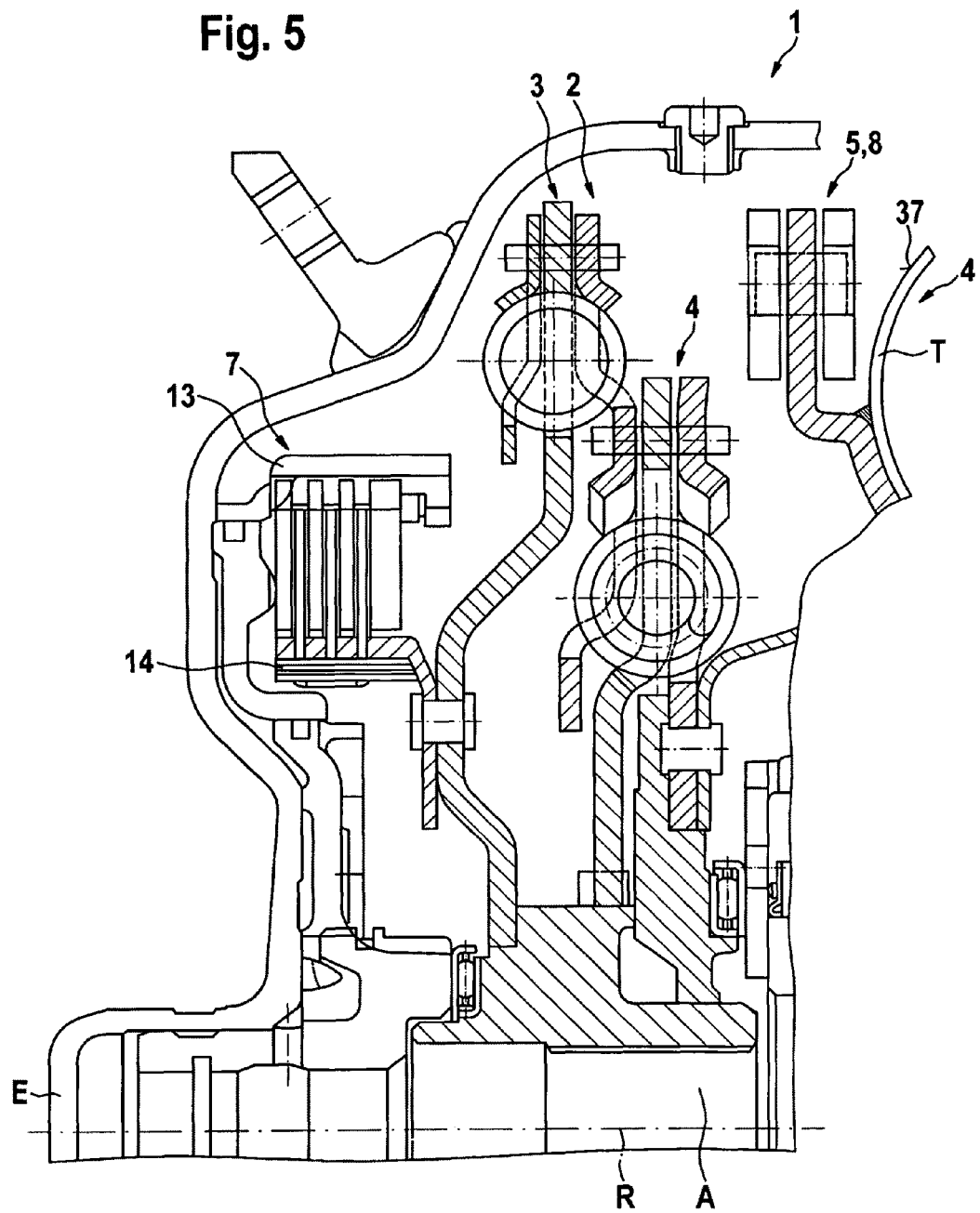

FORCE TRANSMISSION DEVICE IN PARTICULAR FOR POWER TRANSMISSION BETWEEN A DRIVE ENGINE AND AN OUTPUT

RELATED APPLICATIONS

This patent application is a continuation of International patent application PCT/DE 2008/001900 filed on Nov. 17, 2008 claiming priority from and incorporating by reference German patent application DE 10 2007 057 448.9, filed on Nov. 29, 2007.

FIELD OF THE INVENTION

The invention relates to a force transmission device, in particular for power transmission between a drive engine and an output, the device including an input and an output and a damper assembly disposed between the input and the output, the damper assembly including at least two dampers which can be connected in series and a rotational speed adaptive absorber.

Force transmission devices in drive trains between a drive engine and an output are known in the art in various configurations. When an internal combustion engine is used as a drive engine, a rotation occurs at the crankshaft, which superimposes the rotating motion, wherein the frequency of the rotation changes with the speed of rotation of the shaft. Absorber assemblies are being used in order to reduce the superimposed rotation. These include an additional mass that is coupled to the oscillating system through a spring system. The operation of the tuned mass vibration damper is based on the primary mass remaining stationary at a particular excitation frequency, while the additional mass performs a forced oscillation. Since the excitation frequency varies with the speed of rotation of the drive engine, while the resonance frequency of the absorber remains constant, the tuned mass damping effect, however, only occurs at a particular rotational speed. An assembly of this type is, for example, known from the printed document DE 102 36 752 A1. In this printed document, the drive engine is connected with one or plural transmission components through at least one startup element, in particular a clutch or a hydrodynamic speed-/torque converter. Thus, a vibration capable spring-mass system is not connected in series with the drive train, but is connected in parallel therewith, which does not degrade the elasticity of the drive train. This vibration capable spring-mass system functions as an absorber. The absorber is associated with the converter lockup clutch in a particularly advantageous embodiment in order to prevent possible force spikes when the converter lockup clutch closes. According to another embodiment, it is furthermore provided to connect a torsion damper with two torsion damper stages after the startup element, wherein the torsion damper is disposed in the force flow of the drive train. Thus, the spring-mass system is disposed between the first torsion damper stage and the second torsion damper stage, which is intended to yield particularly favorable transmission properties. The spring-mass system can have a variable resonance frequency for use in a broader frequency band, wherein the resonance frequency can be influenced through a control- or regulation system.

Furthermore a force transmission device is known from the printed document DE 197 81 582 T1, which includes a hydrodynamic clutch and a device for locking up the hydrodynamic clutch, wherein a mechanical assembly is provided, which is used for controlling the relative rotation between the input- and output device for the power transmission device.

In order to dampen the effect of an excitation over a broad, advantageously the entire, rotation speed range of a drive engine, tuned mass vibration dampers that can be adapted to a speed of rotation are provided in the drive trains according to DE 198 31 160 A1, wherein the tuned mass vibration dampers can dampen torsional vibrations over a larger speed of rotation range, ideally over the entire speed of rotation range of the drive engine, in that the resonance frequency is proportional to the speed of rotation. The tuned mass vibration dampers operate according to the principle of a circular- or centrifugal force pendulum in a centrifugal force field, which is already used in a known manner for damping crankshaft vibrations for internal combustion engines. For this type of pendulum, inertial masses are supported about a rotation axis so they can perform a pendulum motion, which inertial masses tend to rotate about the axis of rotation at the largest distance possible, when a rotating movement is initiated. The torsional vibrations cause a pendulum type relative movement of the inertial masses. Thus, different systems are known, in which the inertial masses move relative to the torque input axis in a purely translatoric manner on a circular movement path, or according to DE 198 31 160 A1 on a movement path that has a curvature radius that varies at least in sections for an increasing displacement of the inertial mass from the center position.

A startup unit including a hydrodynamic speed-/torque converter and an device for bridging the power transmission through the hydrodynamic speed-/torque converter is known from the printed document DE 199 26 696 A1. It includes at least one additional mass, whose center of gravity can be moved under the influence of a centrifugal force in a radial direction as a function of a relative position of the transmission elements with reference to a rotation axis of the torque transmission path.

A torque transmission device in a drive train of a motor vehicle for torque transmission between a drive engine and an output is known from the printed document DE 10 2006 08 556 A1, wherein the torque transmission device includes at least one torsion vibration damper device in addition to an actuatable clutch device. A centrifugal pendulum device is associated with the torsion vibration damper device, wherein the centrifugal pendulum device includes plural pendulum masses which are linked to the pendulum mass support device by means of running rollers, so they are movable relative to the pendulum mass support device.

Multiple dampers are often being used in force transmission devices which operate in particular rotational speed ranges and which can be tuned to those speed ranges in an optimum manner. However, also with these multiple dampers it is not possible without substantial additional complexity and partially also due to the limited installation space to cover the entire rotational speed range of a drive engine sufficiently with respect to vibration damping.

BRIEF SUMMARY OF THE INVENTION

Thus it is the object of the invention to provide a force transmission device as recited supra, in particular a force transmission device with a multiple damper assembly, comprising at least two dampers connected in series viewed in at least one force flow direction in order to reduce variations in speed of rotation in the force transmission device over the entire operating range of the drive engine, or to eliminate the variations completely.

The solution according to the invention is characterized through the following features: a damper assembly with at least two dampers, which can be connected in series, and a rotational speed adaptive absorber. The rotational speed adaptive absorber is disposed between the at least two dampers at least in one force flow direction through a force transmission device. Further advantageous embodiments of the invention are described by the following, taken individually or in combination:

A hydrodynamic component with at least one primary shell functioning as a pump shell (P) and a secondary shell functioning as a turbine shell (T), forming an operating cavity (AR) with one another, wherein the turbine shell (T) is connected at least indirectly torque proof with an output (A) of the force transmission device, and a coupling is performed through at least one of the at least two dampers of the damper assembly, and wherein the rotational speed adaptive absorber is connected at least indirectly torque proof with the secondary shell.

The rotational speed adaptive absorber is connected directly torque proof with the secondary shell (SR).

The rotational speed adaptive absorber is connected with an element of the damper assembly, and the element is connected torque proof with the secondary shell of the hydrodynamic component.

The rotational speed adaptive absorber is connected with an element of a damper of the damper assembly, and the element is connected directly torque proof with the secondary shell of the hydrodynamic component.

The rotational speed adaptive absorber is coupled with an element of a damper, the element of the damper is connected with an element of another damper of the damper assembly, and the element of the another damper is directly connected with the secondary shell of the hydrodynamic component.

A device for at least partially bridging the power transmission through the hydrodynamic component, wherein the device is connected with an output (A) of the force transmission device through at least one damper of the damper assembly.

The damper assembly is disposed in a force flow between an input (E) and the output (A) in series with a hydrodynamic component and a device for bridging the hydrodynamic component.

The damper assembly is configured to be disposed in the force flow at least in series with a hydrodynamic component.

The damper assembly is configured to be disposed in the force flow at least in series with a device for bridging a hydrodynamic component.

The respective other component, the device or the hydrodynamic component is coupled to the damper assembly through the connection of the at least two dampers.

The at least two dampers of the damper assembly are configured as series or parallel dampers, comprising damper component assemblies.

The damper component assemblies of a damper are disposed on a common diameter.

The damper component assemblies of a damper are disposed on different diameters.

At least one of the dampers is configured as a single damper.

The at least two dampers are disposed offset to one another in radial direction.

The at least two dampers are disposed offset relative to one another in axial direction.

The rotational speed adaptive absorber is configured as centrifugal force pendulum device, comprising at least one inertial mass support device and at least one, preferably a plurality, of inertial masses, which are supported at the inertial mass support device, movable relative thereto in radial direction, so that they can perform a pendulum type motion.

The rotational speed adaptive absorber is disposed and viewed in axial direction, spatially between an input (E) and the output (A) of the force transmission device, between the damper assembly and a hydrodynamic component.

The rotational speed adaptive absorber is disposed in axial direction spatially between the at least two dampers.

The rotational speed adaptive absorber is disposed in axial direction spatially between an input (E) and the output (A) of the force transmission device in front of the at least two dampers of the damper assembly.

Inertial masses are disposed in radial direction in a portion of an extension of the damper assembly.

Each of the at least two dampers comprise at least one primary component and one secondary component, and wherein the primary component or the secondary component are formed either by a flange element, or by drive disks disposed on both sides of the flange elements, are disposed coaxially relative to one another, are rotatable relative to one another in circumferential direction, and are coupled with one another through torque transmission devices and damping coupling devices.

Components of the absorber form an integral unit with components of a connection element, in particular of a damper of the damper assembly or with a secondary shell, or are integrally configured therewith.

A damper of the damper assembly is configured as a mechanical damper or as a combined mechanical hydraulic damper.

The hydrodynamic component is configured as a hydrodynamic speed-/torque converter comprising at least one stator shell (L).

The hydrodynamic component is configured as a hydrodynamic clutch without a stator shell (L).

The rotational speed adaptive absorber is configured for an order of an excitation of a drive unit, in particular the drive engine, and wherein a centrifugal force influence upon a particular inertial mass, which is reduced by a centrifugal oil pressure, is considered by configuring it for an order that is higher by >0.05 to 0.5 than for embodiments without the centrifugal oil pressure.

A force transmission device configured according to the invention, in particular for power transmission between a drive engine and an output, including a damper assembly with at least two dampers which can be connected in series and a rotational speed adaptive absorber is characterized in that the rotational speed adaptive absorber is disposed between the dampers at least in one force flow direction through the damper assembly.

Thus, a rotational speed adaptive absorber according to the invention is a device which does not transfer torque, but which is configured to absorb excitations over a very broad range, advantageously the entire rotational speed range of a drive engine. The resonance frequency of rotational speed adaptive absorber is proportional to the rotational speed, in particular to the rotational speed of the exciting engine.

The solution according to the invention provides a reduction or prevention of an introduction of rotational speed variations into the drive train in particular in a force flow direction which is preferably always used in the main operating range. Furthermore, the entire damping system can be better adapted to the rotational vibrations to be absorbed without substantial additional modifications of the particular dampers.

The force transmission device can be embodied in various configurations. According to a particularly preferred embodiment it is a combined start up unit, which can also be used as a multifunctional unit. It includes a hydrodynamic component with at least one primary shell functioning as a pump shell and a secondary shell functioning as a turbine shell, forming an operating cavity with one another, wherein the turbine shell is connected to the output of the force transmission device at least indirectly torque proof and the coupling is performed through at least one damper of the damper assembly, wherein the rotational speed adaptive absorber is connected to the secondary shell at least indirectly torque proof. The term "at least indirectly" means that the coupling can either be performed directly without an intermediary connection of additional transmission elements or indirectly through coupling with additional transmission elements or through the additional transmission elements.

Through the association of the rotational speed adaptive absorber with the turbine shell it can advantageously be effective in all operating states due to the connection of the turbine shell with the drive train, in particular with the damper assembly.

According to a particularly preferred embodiment the rotational speed adaptive absorber is connected directly torque proof with the secondary shell. Thus, assemblies are feasible which can be implemented independently from the damper assembly based on the coupling of the secondary shell with the damper assembly, however, the effectiveness is not impaired.

According to another embodiment the rotational speed adaptive absorber is connected to a damper of the damper assembly. Through this embodiment a direct association with the damper system is feasible. Thus, the coupling can be performed directly with an element of a damper which is connected torque proof with the secondary shell or with an element of the other damper, which is connected with the damper element of the first damper, wherein the damper element is connected torque proof with the secondary shell. This yields various options to arrange the rotational speed absorber, wherein the optimum arrangement can be selected based on the available installation space without impairing the functionality.

The rotational speed adaptive absorber can be configured as a component preassembled separately. The rotational speed adaptive absorber, thus can be combined with standardized components without requiring them to be modified. Furthermore, a simple replacement is provided. Furthermore, the rotational speed adaptive absorber can be preassembled and stored in quantities.

According to a second embodiment the rotational speed adaptive absorber or its components, in particular of the inertial mass support device, are configured as components of one of the connection elements, wherein the connection element is formed either by an element of a damper of the damper assembly or for a direct coupling with the secondary shell or the turbine shell, the connection element is formed by the turbine shell. This embodiment is characterized by substantial modifications of the connection element however, thus in particular in axial direction in installed position viewed from the input to the output installation space is saved, since the rotational speed adaptive absorber does not have to be disposed as a separate element between the other elements anymore.

For a separate embodiment of the rotational speed adaptive absorber it can be connected with the connection elements for an integration through the mounting elements, the connection elements being provided anyhow, in that the connection portion of the rotational speed adaptive absorber is placed into the mounting portion between the connection elements and advantageously the mounting elements which are provided anyhow are used for coupling the absorber.

With respect to the configuration of the particular dampers themselves, there is a multitude of options. The damper assembly is, as stated supra, configured as a series damper in at least one force flow direction. The particular dampers of the damper assembly can be configured as singular dampers or as series or parallel damper components assemblies. Thus, the particular implementable damping stages can be influenced additionally with respect to the characteristic damping curves obtainable therewith and can thus be adjusted to certain requirements in an optimum manner where necessary.

With respect to the arrangement of the dampers there are many options. These options, however, in turn depend on the actual configuration of the particular dampers. Thus a differentiation is made between the arrangement from a functional point of view and from a spatial point of view. From a spatial point of view, in particular viewed in axial direction between the input and the output of the force transmission device, the spatial arrangement of the dampers relative to one another within the damper arrangement can be performed offset relative to one another in axial- or radial direction. Advantageously assemblies offset relative to one another in radial direction are always selected, since hereby a better utilization of the installation space is possible through the overlapping arrangement. Furthermore, intermediary spaces are created through the offset arrangement in radial direction in the portion of the outer circumference of the first damper viewed in the extension in radial direction of the second damper, wherein the intermediary spaces can be ideally used for arranging the rotational speed adaptive absorber From a purely functional point of view at least one of the dampers can be actually arranged in one of the power paths without acting as an elastic clutch in the other power path. In this case, the damper then functions as a pure absorber in the other power path. In this respect a differentiation is made between two embodiments, wherein the first is characterized by disposing the first damper in force flow direction in the force flow viewed from the input to the output in the mechanical power path, while the arrangement is performed in the hydrodynamic power path in the second case. The second damper in the damper assembly is then functionally connected is series in both paths, but operates as an absorber. Thus, a damper is always effective in force flow direction viewed from the input to the output. According to a particular preferred embodiment also the rotational speed adaptive absorber is associated with this damper.

The configuration of the rotational speed adaptive absorber can be performed in many ways. It is in common for all embodiments that they are characterized by an inertial mass support device which extends in radial direction, wherein the extension can be performed as a flat disc element or as a respectively configured component. The component is disposed coaxial with the rotation axis of the forced transmission device. Inertial masses are supported at the inertial mass support device so they pivot in a pendulum type motion about the rotation axis of the force transmission device, wherein respective inertial masses are preferably disposed on both sides of the inertial mass support device without an offset from one another. These inertial masses supported for a pendulum type motion are displaced in radial direction under the influence of a centrifugal force. The basic principle of the rotational speed adaptive absorber which functions like a centrifugal force pendulum is thus characterized by the masses which are supported at the inertial mass support device for a pendulum type motion. These can be modified additionally through additional measures, for example, for improving the sound development or for extending their possible effective operating range. Such embodiments are sufficiently known in the prior art. Therefore the configuration of centrifugal force pendulums is not addressed further in detail.

Rotational speed adaptive absorbers can thus be disposed from a spatial point of view in front of the damper assembly, behind the damper assembly, and between the particular dampers of the damper assembly. Each of these arrangements can have particular relevance with respect to the actual conditions. Arrangements between the two dampers, however, are desirable in order to use installation space which is available anyhow and which may not have been utilized.

According to a particularly preferred embodiment the rotational speed adaptive absorber is always configured for the order of excitation of the drive unit, in particular the drive engine. Thus, the centrifugal force influence upon the particular inertial masses which is reduced through the centrifugal oil pressure is also considered in force transmission devices with a hydrodynamic component. The consideration is performed through a configuration and a design for an order which is higher by 0.05 to 0.5 than for configurations without this centrifugal oil pressure, this means for dry operating absorbers.

BRIEF DESCRIPTION OF THE DRAWINGS

The solution according to the invention is subsequently described with reference to drawing figures:

FIG. 5 illustrates an option for directly coupling the rotational speed adaptive absorber with the turbine shell;

DETAILED DESCRIPTION OF THE INVENTION

Figure 1A:
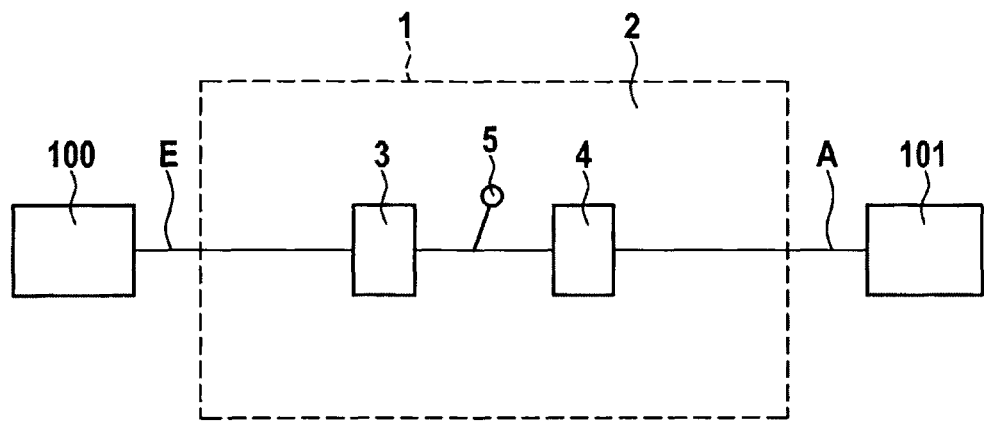
FIGS. 1a-1d illustrate possible basic configurations of force transmission devices with a functional disposition of rotational speed adaptive absorbers in a simplified schematic illustration.

FIG. 1a illustrates the basic configuration of a force transmission device according to the invention in a simplified schematic depiction for power transmission in particular in drive trains of vehicles. Thus, the force transmission device 1 is used for power transmission between a drive engine 100 which can, for example, be configured as a combustion engine and an output 101. The force transmission device 1 includes at least an input E and an at least an output A. The input E is thus connected to the drive engine 100 at least indirectly, the output A is thus connected at least indirectly with the units 101 to be driven, for example, in the form of a transmission. "At least indirectly" thus means that the coupling is either performed directly, this means without additional transmission elements disposed there between, or indirectly through additional transmission elements. The terms "input" and "output" are thus to be interpreted in a functional manner in force flow direction from a drive engine to an output and they are not limited to particular configurative details of embodiment.

The force transmission device 1 includes a damper assembly 2 which is disposed between the input E and the output A. The damper assembly 2 includes at least two dampers 3 and 4 which can be connected in series which form damper stages and a rotational speed adaptive absorber 5. A rotational speed adaptive absorber 5 is thus interpreted as a device for absorbing variations in rotational speed, the device not transmitting power, but configured to absorb rotational vibrations over a larger range of rotational speeds, advantageously over the entire range of rotational speeds, in that inertial masses tend to move in a circular path with a maximum distance about the torque induction axis due to a centrifugal force. The rotational speed adaptive absorber 5 is thus formed by a centrifugal force pendulum device. The resonance frequency of the absorber 5 is thus proportional to the speed of the exciting unit, in particular of the drive engine 100. The superposition of the rotation through rotational vibrations leads to a pendulum type relative movement of the inertial masses. According to the invention the rotational speed adaptive absorber 5 is connected in the force flow in at least one of the theoretically possible force flow directions viewed over the damper assembly 2 between the two dampers 3 and 4 of the damper assembly 2. Besides damping vibrations through the particular dampers 3 and 4, the rotational speed adaptive absorber 5 thus operates at different frequencies.

There is a plurality of options for the embodiment of the dampers 3 and 4 of the damper assembly 2 and their connection in force transmission devices 1 with additional components. Thus, in particular for embodiments with a hydrodynamic component 6 and a device 7 for at least partially locking up the hydrodynamic component, a differentiation is made between embodiments with a series connection of the dampers 3 and 4 with respect to their function as an elastic clutch, this means torque transmission and damping in both power paths or at least for a power transmission through one of the components with a series connection of the dampers 3, 4 as elastic clutches and a power transmission through the other component with one of the dampers 3 or 4 acting as an elastic clutch and the other damper 3 or 4 acting as an absorber.

Figure 1B:
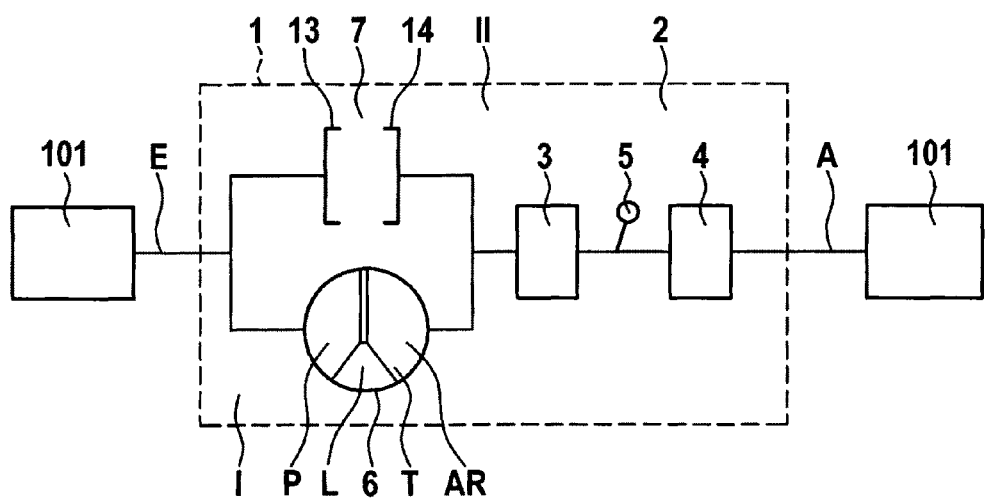

FIG. 1b illustrates a particularly advantageous embodiment of the force transmission device 1 with a damper assembly 2 with an integrated rotational speed adaptive absorber 5, including at least a hydrodynamic component 6 and a device 7 for at least partially circumventing the force transmission through the hydrodynamic component 6. The hydrodynamic component 6 includes at least one primary shell functioning as a pump shell P when coupling with the input E and for a force flow direction from the input E to the output A and a secondary shell coupled at least indirectly with the output A torque proof and functioning as a turbine shell T for a power transmission from the input E to the output A, the pump shell P and the turbine shell T forming an operating cavity AR. The hydrodynamic component 6 can be configured as a hydrodynamic clutch which provides speed conversion or it can be configured in a particularly advantageous embodiment as a hydrodynamic speed-/torque converter wherein the power transmission through the hydrodynamic speed-/torque converter always provides a torque and moment conversion. In this case the hydrodynamic component 6 includes at least another so called stator shell L, which can either be supported fixed in place or rotatable depending on the embodiment. The stator shell L can furthermore be supported at a freewheeling clutch. Thus, the hydrodynamic component 6 is disposed between the input E and the output A. This describes a first power path I in the force flow between the input E and the output A viewed over the hydrodynamic component 6. The device 7 for bridging the hydrodynamic component 6 is advantageously provided in the form of a so called lock up clutch which is an actuatable clutch device in the simplest case. The clutch device can be configured as a synchronously actuatable clutch device typically; however, it is configured as a friction clutch preferably in disc configuration. The clutch device is also disposed between the input E and the output A and defines a second power path when power is transmitted through the clutch device in which the power transmission is performed mechanically. Thus, the damper assembly 2 is disposed behind the device 7 in force flow direction from the input E to the output A and furthermore disposed behind the hydrodynamic component 6. The rotational speed adaptive absorber 5 is thus disposed subsequent to the hydrodynamic component 6 and also subsequent to the mechanical clutch in force flow direction from the input E to the output A. This is implemented in that the rotational speed adaptive absorber 5 configured as a centrifugal force pendulum is connected at least indirectly torque proof with the secondary shell of the hydrodynamic component 6 functioning as a turbine shell T in at least one operating state and it is furthermore connected with the output of the device 7.

FIG. 1a and FIG. 1b only illustrate the basic arrangement in a force transmission device 1 with a rotational speed adaptive absorber 5 between two dampers 3 and 4 which can be connected in series in a highly simplified schematic depiction, wherein the dampers 3 and 4 are connected in series at least in one force flow direction, in this instant case in both force flow directions, and act as devices for damping vibrations, this means quasi as an elastic clutch, independently from how the particular dampers 3 and 4 are actually configured.

Figure 1C:
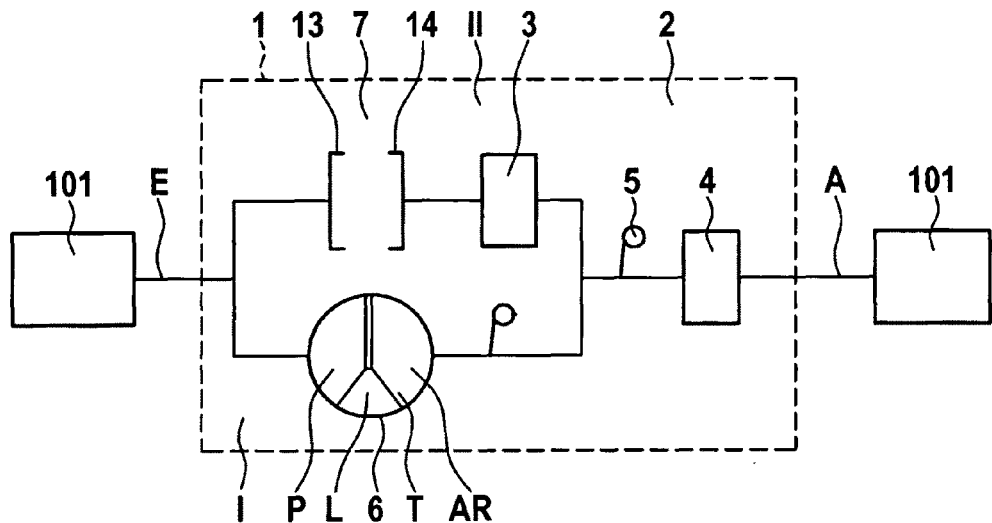
Figure 1D:
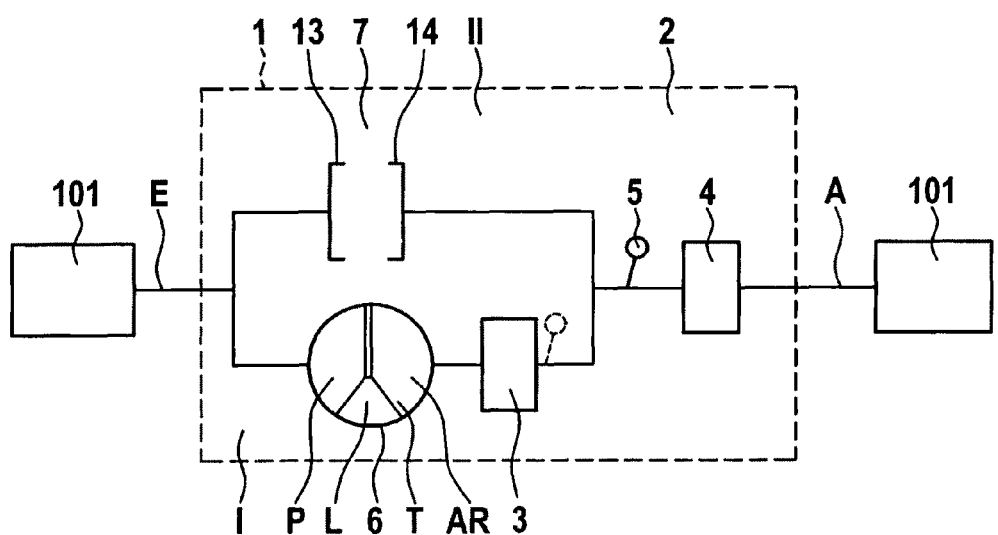

FIG. 1c and FIG. 1d illustrate in a simplified schematic depiction analogously to FIG. 1b another force transmission device configured according to invention, wherein however both dampers 3 and 4 are only connected in series in their function as an elastic clutch in one force flow direction in one power path I or II. According to FIG. 1c, thus the assembly of both dampers 3 and 4 connected in series is always connected subsequent to the mechanical power path II, viewed in the force flow direction between the input E and the output A. The connection of the hydrodynamic component 6, in particular the turbine shell T is performed here between the two dampers 3 and 4. The rotational speed adaptive absorber 5 is thus disposed subsequent to the hydrodynamic component 6 in force flow direction 6 in this case. The rotational speed adaptive absorber 5 is also disposed between the two dampers 3 and 4, wherein the connection is either performed directly at the turbine shell T or at the connection or in the area of the connection of the turbine shell T with the damper 4.

On the other hand, FIG. 1d illustrates and embodiment in which the two dampers 3 and 4 are connected in series always after the hydrodynamic component 6 in the force flow from the input E to the output A, wherein the damper 3 acts as an absorber for a mechanical power transmission, while the damper 4 entirely acts as a vibration damper configured as an elastic clutch. Also here the rotational speed adaptive absorber 5 is either connected directly in front of the damper 4 and thus for a power transmission through the hydrodynamic component 6 at least indirectly connected with the turbine shell T, herein indirectly connected to the damper 3. Furthermore, the rotational speed adaptive absorber 5 is always effective in this embodiment also for a purely mechanical power transmission in the second mechanical power path II, since it is connected together with the damper 4.

Figure 2:
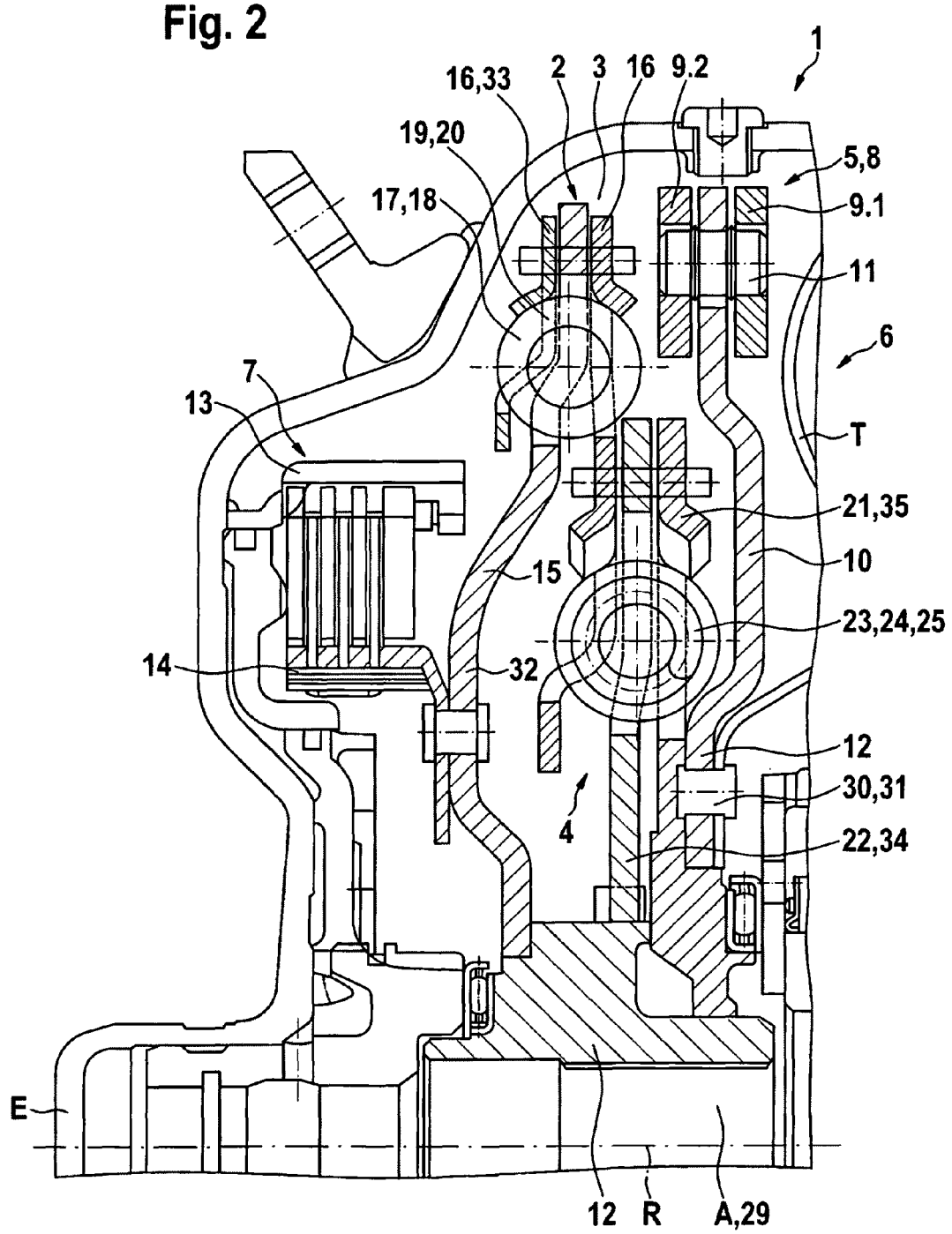
FIG. 2 illustrates a first embodiment of a force transmission device configured according to the invention with reference to an axial sectional view.
Figure 3:
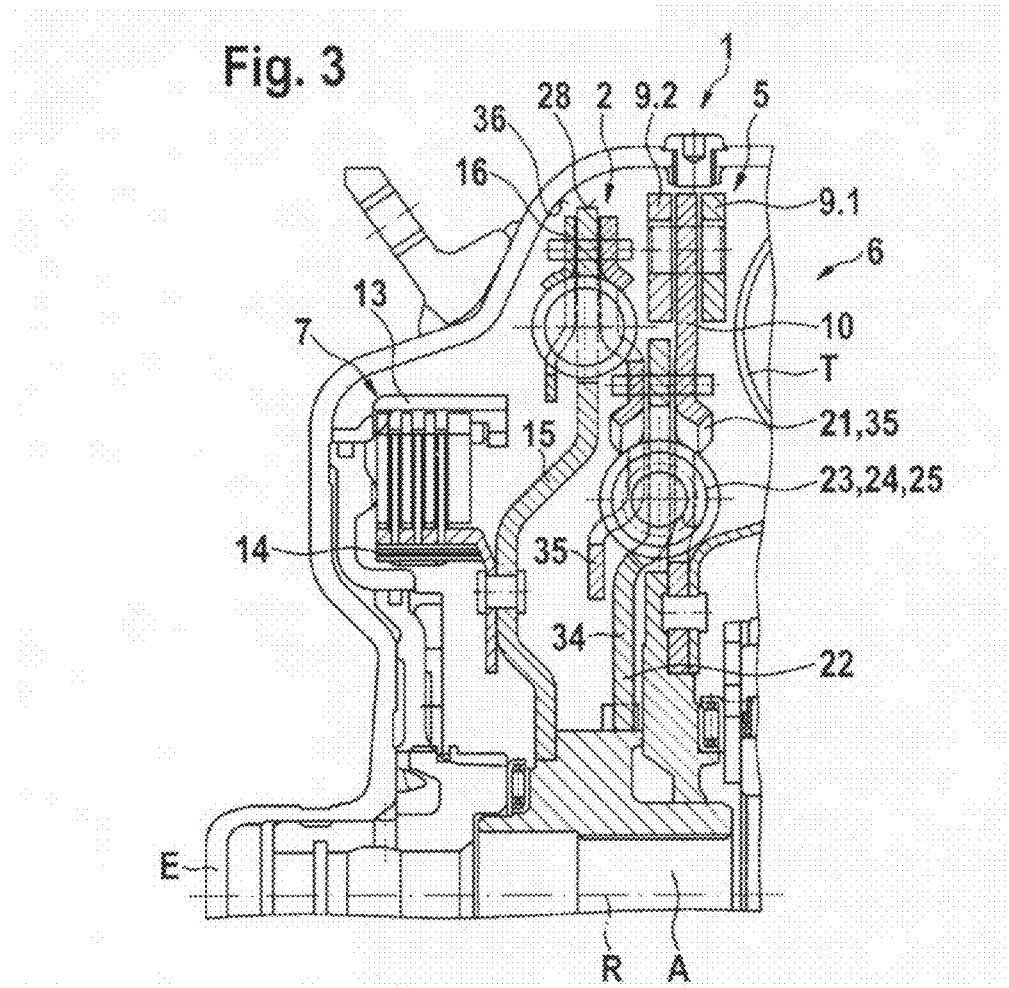
FIG. 3 illustrates a second embodiment of a force transmission device configured according to the invention with reference to an axial sectional view.

FIG. 2 and FIG. 3 illustrate two particularly advantageous embodiments of force transmission devices 1 configured according to the invention in a configuration according the FIG. 1c with reference to a detail from an axial sectional view of the force transmission devices.

FIG. 2 thus illustrates an embodiment with a separate configuration of the rotational speed adaptive absorber 5 and its connection with the damper assembly 2. The rotational speed adaptive absorber 5 is configured as a centrifugal force pendulum device 8 and includes one, preferably several inertial masses 9.1, 9.2 which are supported at an inertial mass support device 10 moveable relative thereto. Thus, the support is performed, for example, through support rollers 11. The inertial mass support device 10 is configured herein as a disc shaped element which forms a hub component 12, which is configured in radial direction with respect to the rotation axis R in the radially inner portion of the disc shaped element or it can also be connected with a hub component 12 of this type. The inertial mass device 10 is preferably configured as a flat planar element or at least as an annular disc shaped element. Also configurations with a cross sectional shaping, for example, in the form of shaped sheet metal components are conceivable. Advantageously, inertial masses 9.1 and 9.2 are provided on both sides of the inertial mass support device 10. These are advantageously supported in the portion of the radially outer diameter of the inertial mass support device 10 through the running track 11, so they perform a pendulum type movement relative to the inertial mass support device. Due to the centrifugal mass influence, the inertial masses 9.1, 9.2 adjust at least in radial direction to the outside, furthermore at least one inertial mass 9.1, 9.2 can move starting at a center position in which the largest distance of its center of gravity S from the center axis M is provided, which corresponds to the rotation axis R of the force transmission device, relative to the hub component 12 along a movement track back and forth into a displaced position, wherein the distance of the center of gravity S of the at least one inertial mass 9.1, 9.2 changes relative to the center position. The inertial mass support device 10 is formed here by a separate element. Thus, the entire centrifugal force pendulum unit 8 can be preassembled separately and can be stored and handled separately as a component.

The force transmission device 1 includes a hydrodynamic component 6, wherein only a detail of the secondary shell functioning as a turbine shell T is illustrated here, wherein the secondary shell is coupled to the output A at least indirectly torque proof. The output A is formed here, for example, by a shaft 29, which is only indicated and which can be formed by a transmission input shaft for use in drive trains for motor vehicles, or can be formed by an element coupled torque proof with the input shaft, in particular a hub 12. The hub 12 is also designated as a damper hub. The coupling of the turbine shell T with the output A is performed here through the damper assembly 2, in particular the second damper 4. The damper assembly 2 includes two dampers 3 and 4, which can be connected in series, respectively forming a damper stage, wherein the two damper stages are disposed offset to one another in radial direction, thus forming a first outer and a second inner damper stage. The dampers 3 and 4 are configured here as single dampers. However, configuring them as series or parallel dampers is also feasible. Thus, advantageously, the first radial damper stage is configured as a radially outer damper stage for implementing the space and installation space saving arrangement. This means it is arranged on a larger diameter than the second radially inner damper stage. The two dampers 3 and 4 or the damper stages formed by them are connected in series in the force flow between the input E and the output A, viewed over the device 7 for circumventing the hydrodynamic component 6 configured as a lockup clutch. The device 7 for bridging configured as a lockup clutch, thus includes a first clutch component 13 and a second clutch component 14, which can be brought into operative engagement with one another at least indirectly torque proof; this means directly or indirectly through additional transmission elements. The coupling is thus performed through friction pairings, which are formed by the first and second clutch components 13 and 14. The first clutch component 13 is thus connected at least indirectly torque proof with the input E, advantageously directly connected therewith, while the second clutch component 14 is coupled at least indirectly torque proof with the damper assembly 2, in particular the first damper 3, preferably directly with the input of the first damper 3. The first and the second clutch components 13 and 14 include an inner disk packet and an outer disk packet in the illustrated case, wherein in the illustrated case, the inner disk packet is made of inner disks supported at an inner disk support, which inner disks form axially aligned surface portions, which can be brought into operative engagement with surface portions complementary thereto, which surface portions are disposed at outer disks disposed at the outer disk support of the first clutch component 13. At least a portion of the inner disks and of the outer disks is thus movably supported in axial direction at the respective disk support. The second clutch component 14 is coupled here with an element disposed in the force flow direction from the input E to the output A, wherein the element functions as an input component for the damper 3. The element is designated as primary component 15. The first damper 3 furthermore comprises a secondary component 16, wherein the primary component 15 or the secondary component 16 are coupled with one another through torque transmission devices 17 and damping coupling devices 18, wherein the means for damping coupling devices 18 are formed by the torque transmission devices 17, and in the simplest case by elastic elements 19, in particular spring units 20. The primary component 15 and the secondary component 16 are thus rotatable relative to one another in circumferential direction. This also applies analogously for the second damper 4, which is configured herein as a radially inner damper and thus as an inner damper. The damper also includes a primary component 21 and a secondary component 22, which are coupled with one another through torque transmission devices 23 and damping coupling devices 24, wherein the primary component 21 and the secondary component 22 are rotatable relative to one another in circumferential direction within limits. Also here, the torque transmission devices 23 can be formed by the damping coupling devices 24, or they can be functionally integrated into a component, preferably in the form of spring units 25. Primary components 15 and secondary components 16 or 21 and 22 of the two dampers 3 and 4 can thus be configured in integrally or in several components. Advantageously, respectively one of the two is made from two disk elements coupled with one another torque proof, between which the respective other component, the secondary component 22, 16 or the primary component 21, 15, is disposed.

In the illustrated embodiment, the respective primary component 15 or 21 functions as an input component for a power transmission between the input E and the output A, while the secondary component 16 or 22 functions as an output component of the respective damper 3, 4. The input component, and thus the primary component 15 of the first damper 3, is formed by a disk shaped element in the form of a drive flange 32. The secondary component 16 is formed by two elements, also designated as drive disks 33, which are disposed in axial direction on both sides of the primary component 15 and coupled torque proof with one another. Thus, the secondary component 16 of the first damper 3 is connected torque proof with the primary component 21 of the second damper 4 or forms an integral unit therewith, wherein also an integral embodiment between the primary component 21 and the secondary component 16 is possible. The primary component 21 of the second damper 4 is formed herein by two disk shaped elements also designated as drive disks 35, while the secondary component 22 is formed by a disk shaped element disposed in axial direction between the drive disks 35, in particular a flange 34; this means it is formed by an intermediary disk, which is connected torque proof with the output A, herein in particular the hub 12. The primary component 12 of the second damper 4 is further connected torque proof with the turbine shell T, in particular the secondary shell of the hydrodynamic component 6. In the simplest case, the coupling 30 is performed through friction locked and/or form locked connections. In the illustrated case, a connection is selected in the form of a rivet joint, wherein the rivets can either be configured as extruded rivets or as separate rivets. Furthermore, the connection between the secondary component 22 and the turbine shell T is used in order to facilitate the coupling 31 with the rotational speed adaptive absorber 5. The rotational speed adaptive absorber, in particular the inertial mass support device 10 configured as a disk shaped element, is disposed and connected in this embodiment in axial direction between the primary component 21 of the second damper 4, which primary component is formed by the drive disks 35, and the turbine shell T or an element coupled torque proof with the turbine shell T. In this embodiment, no particular specification is required for the configuration of the damper assembly 2 based on the separate configuration. Herein, standardized components can be selected, which can be supplemented with the rotational speed adaptive absorber 5. The rotational speed adaptive absorber 5 can thus be preassembled and also replaced as a unit that can be handled separately. Furthermore, the rotational speed adaptive absorber or components thereof, in particular the inertial masses 9.1, 9.2, can be disposed using the installation space in radial direction above the second damper 4. The disposition of the absorber 5 is performed here in axial direction, especially between the damper assembly 2 and the hydrodynamic component 6.

On the other hand, FIG. 3 illustrates a particularly advantageous improvement according to FIG. 2, in which the rotational speed adaptive absorber 5 is a component of an element of the damper assembly 2, in particular of the primary component 21 of the second damper 4. In this embodiment, thus at least one drive disk 35 of the primary component 21 and the inertial mass support device 10 form an integral unit, or are formed by a component. Thus, the drive disk 35 is extended in radial direction towards the inner circumference 36, and extends into the portion of the outer circumference 28 of the first damper 3 in radial direction and beyond. In particular for the arrangement of the two dampers 3 and 4 illustrated in FIG. 3 with an offset in axial direction and in radial direction, thus the gained or freely available installation space can be used in an optimum manner.

Figure 4:
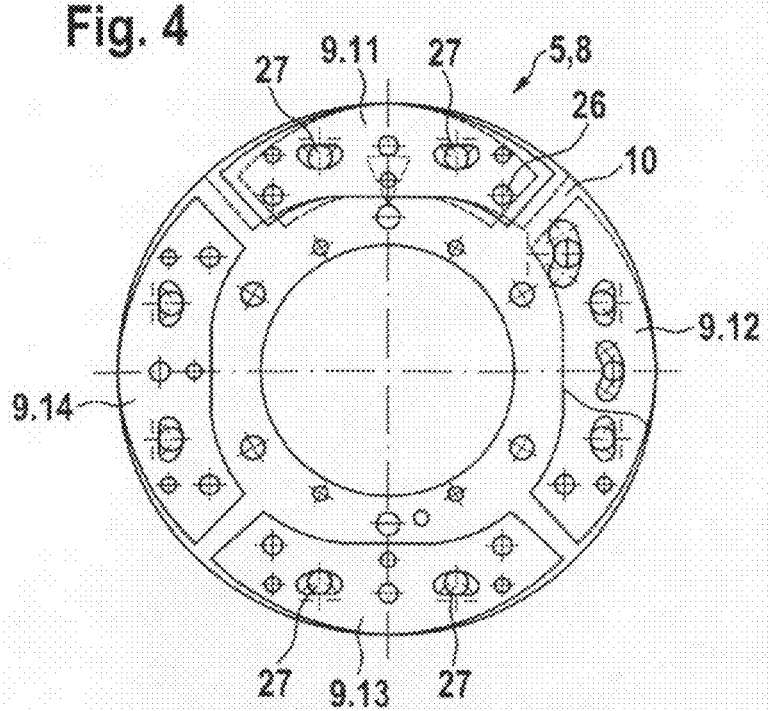
FIG. 4 illustrates an exemplary embodiment of a rotational speed adaptive absorber in a view from the right.

The configuration of an absorber, which can be adapted to a speed of rotation, can be embodied in many ways. Reference is made in this context to the printed documents DE 10 2006 028 556 A1 and DE 198 31 160 A1. The disclosure of these printed documents with respect to embodiments of rotational speed adaptive tuned mass vibration dampers is thus included into the instant application in its entirety. Absorbers are adaptive to a rotational speed when they can absorb rotational vibrations over a large rotational speed range, ideally over the entire rotational speed range of the drive engine. The inertial masses 9.1, 9.2 thus tend due to gravity to move on a maximum radius relative to the torque induction axis. Through the superposition of the rotational movement with the rotational vibrations, a pendulum type relative movement of the inertial masses 9.1, 9.2 is caused. They adjust with respect to their position solely based on the centrifugal force or based on their weights, this also applies for their resetting. There is no separate resetting force. Furthermore, the resonance frequency is proportional to the rotational speed, so that rotational vibrations with frequencies, which are proportional to the rotational speed n in the same manner, can be absorbed over a large rotational speed range. Thus, the inertial masses 9.1, 9.2 of absorbers 5 move in a purely translatoric manner on a circular movement path relative to the hub component. An embodiment is known for the printed document DE 198 31 160 A1, for which the movement path is characterized e.g. by a curvature radius, which changes at least in sections for an increasing displacement of the inertial masses 9.1, 9.2 from the center position. This applies also for the embodiment of DE 10 2006 028 556 A1. A configuration of this type is depicted in a side view in an exemplary manner as a configuration of a rotational speed adaptive absorber 5 in FIG. 4. This is an exemplary embodiment. Other configurations are conceivable. A configuration of an annular disk shaped element as inertial mass support device 10 is conceivable herein, and the particular inertial masses 9.1-9.n disposed thereon distributed in circumferential direction. In the illustrated case, four inertial masses configured as pendulum masses 9.11-9.14 are movably disposed. These are retained with jacketed shoulder bolts 26 and through support rollers 27 movably at the pendulum mass support device 10.

FIG. 2 and FIG. 3 illustrate particularly advantageous applications in a force transmission device 1, and other configurations are conceivable. FIG. 5 illustrates the direct coupling of the rotational speed adaptive absorber 5 with the turbine shell T of the hydrodynamic component 6. Since the turbine shell T of the hydrodynamic component is connected torque proof with the primary component 21 of the second damper 4, either directly or through additional intermediary elements, also here, an intermediary connection of the absorbers 5 between the two dampers 3 and 4 is provided in the force flow between in the input E and the output A. The disposition at the turbine shell T can thus be performed in the portion of the radial outer circumference 37 of the turbine shell T, thus the disposition can be performed on a radius that is equal to or greater than the radial extension of the turbine shell T or smaller and quasi besides it in axial direction.

Additional connections are described in a schematically simplified illustration in the FIGS. 6a-6d. For the embodiment according to FIG. 6a, the first damper 3 is configured analogously to the embodiments described in FIGS. 2 and 3. The second damper 4 is characterized in that the primary component 21 is formed by the intermediary disk, and the secondary component 22, which is coupled torque proof with the output A, is formed by two side disks 35 disposed in axial direction next to the intermediary disk 34. In this case, the rotational speed adaptive absorber 5 is connected torque proof with the connection between the secondary component 16 of the first damper 3 configured in the form of drive disks 33 and the intermediary disk 34 in the form of the second damper, preferably connected torque proof with the drive disk 33. This holds analogously also for the turbine shell T.

In another embodiment in which the damper assembly 2 includes a first damper 3, in which the primary component 15 is formed, for example, by two drive disks 33, which are at least indirectly coupled with the input E and the secondary component 16 is formed by an intermediary disk in the form of a flange 32. The coupling of the secondary component 16 can either be performed through the primary component 21 configured as a drive disk 35 or by a primary component 21 of the second damper 4 formed by an intermediary disk or a flange 34. According to FIG. 6b, the primary component 21 of the second damper 4 is configured analogously to the embodiments according to FIGS. 2 and 3; this means it is formed by two drive disks 35 or by one drive disk 35. The secondary component 22 is formed by the flange 34. The primary component 15 of the first damper 3 is formed by two drive disks 33 coupled torque proof with one another and the secondary component 16 is formed by a flange 32. The secondary component 16 configured as a flange 32 thus forms an integral unit with the drive disks 35 or one of the drive disks 35 and thus of the primary component 21 of the second damper 4. Thus, it is also conceivable to form these components from separate elements which are coupled torque proof with one another. Also, the drive disks 35 of the first and also the second damper 3, 4 are respectively coupled torque proof with one another, wherein the coupling can be performed in many ways. The turbine shell T of the hydrodynamic component 6 is coupled in this embodiment with the primary component 21, in particular the drive disks 35. With respect to the disposition of the rotational speed adaptive absorber 5, there is a plurality of options also here. The absorber 5 can either be coupled directly with the turbine shell T, the primary component 21 of the second damper 4, in particular one of the drive disks 35, or with the flange 32 of the first damper 3. The particular options for the arrangement are represented here in dash-dotted lines.

Figure 6A:
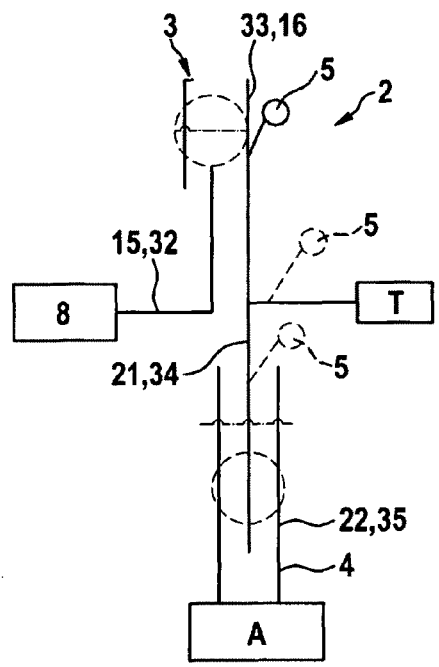
FIGS. 6a-6d illustrate possible configurations of damper assemblies providing connection options for a rotational speed adaptive absorber.
Figure 6B:
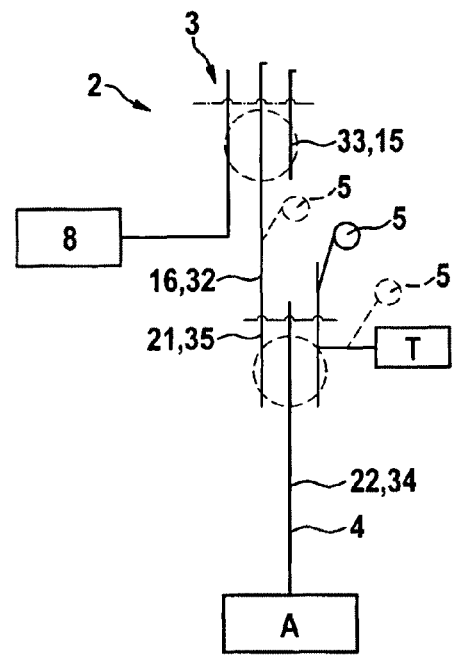
Figure 6C:
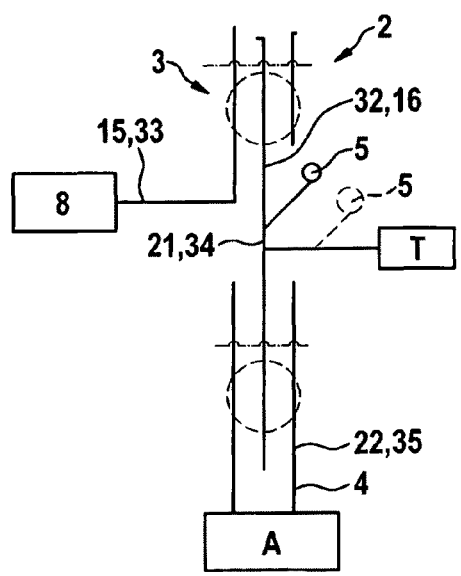

Compared to that, FIG. 6c illustrates a configuration of the first damper 3 according to FIG. 6b. However, herein the primary component 21 of the second damper 4 is formed by the flange 34. The secondary component 22 is formed by the drive disks 35. The connection of the turbine shell T is performed in this case at the flange 34. The rotational speed adaptive absorber 5 is then either coupled directly with the turbine shell T or the flange 34, which simultaneously forms the flange 32 of the first damper 3.

Thus, in FIG. 6c the second damper 4 acts in the hydrodynamic power path 1 as an elastic clutch, the first damper 3 acts as an absorber. This applies analogously also for the embodiment according to FIG. 6a and FIG. 6b.

FIG. 6a and FIG. 6b illustrate embodiments in which the two dampers are disposed in axial direction viewed from the input E to the output A of the force transmission device 1 offset relative to one another, and FIG. 6c illustrates an embodiment with a disposition of the two damper stages in one axial plane.

Figure 6D:
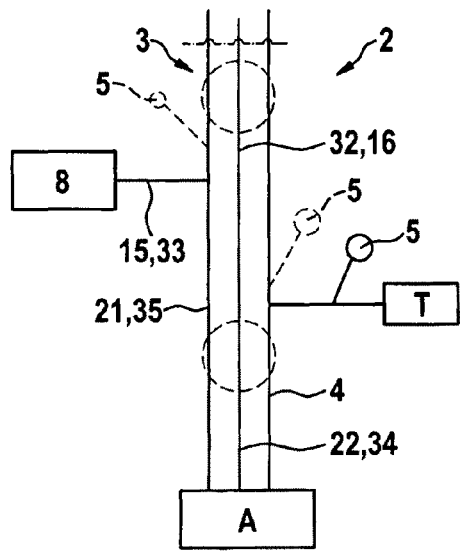

FIGS. 6a-6c furthermore illustrate embodiments with an effect of the damper 3 for a hydrodynamic power transmission as an absorber. Contrary thereto, FIG. 6d illustrates an embodiment with a function of both dampers 3, 4 in both power paths as an elastic coupling. For this elastic coupling, the primary components 15 and 21 of the two dampers 3 and 4 and the secondary component 16 and 22 of the dampers 3 and 4 are formed respectively by like components. The series connection is implemented by the free angle in the dampers in circumferential direction. For example, the openings of the outer damper 3, which support the force transmission devices, and which form stops in circumferential direction, are provided with a free angle portion in unloaded condition, while the openings at the inner damper 4 are configured so that the torque transmission devices, in particular the spring elements 35, are always in contact. In the illustrated case, for example, the primary components 15 and 21 are formed by two drive disks 33 or 35, the secondary components 16, 22 are formed by a flange 34 or 32 disposed between the secondary components, wherein the flange is coupled torque proof with the output A. The connection of the device 7 and also of the turbine shell T is thus performed at one of the drive disks 33, 35, wherein the damper assembly 2 viewed in axial direction in three dimensions is disposed between the device 7 and the hydrodynamic component 6. The connection of the rotational speed adaptive absorber 5 is performed here at one of the drive disks 33, 35, advantageously at the drive disk at the side of the turbine shell.

The spatial arrangement between the input E and the output A is performed for almost all embodiments according to FIGS. 6a-6c as a function of the arrangements of the particular dampers 3, 4 with an offset in axial- and in radial direction. When the offset is provided, then the intermediary space in radial direction can be used in an optimum manner for the arrangement of the rotational speed adaptive absorber 5. Otherwise, the arrangement is performed in axial direction adjacent to the particular dampers.

For the damper assemblies 2 illustrated in FIGS. 1-6, the particular dampers 3 and 4 are formed by so-called single dampers provided as mechanical dampers, wherein the single dampers are configured as compression spring dampers or arc spring dampers. This means that the torque transmission devices 17, 13 and the damping coupling devices 18, 24 are formed by the spring units 20, 25 configured as arc springs or compression springs. However, also other damper concepts are conceivable, for example, combined mechanical-hydraulic dampers.

It is furthermore also conceivable to use the solution according to the invention in multiple damper assemblies, in which the particular dampers 3 and 4 already form a damper stage by themselves and are configured as multiple dampers in the form of parallel- or series dampers.

Figure 7:
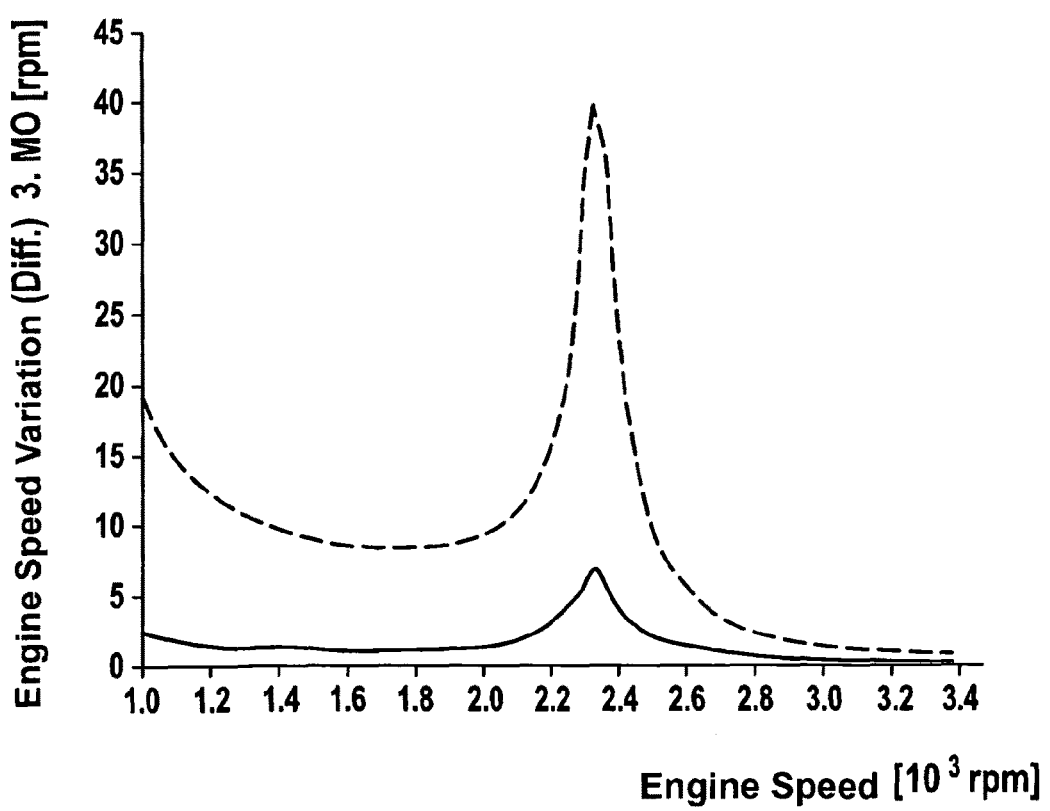
FIG. 7 illustrates the advantages of the solution according to the invention over an embodiment without a rotational speed adaptive absorber with reference to a diagram.

FIG. 7 illustrates the rotational speed variations in a drive train with respect to a diagram, in which the rotational speed variation in the drive train is plotted over the engine speed n, comparing an embodiment of a force transmission device without a rotational speed adaptive absorber 5 with a dashed line and a force transmission device 1 with a rotational speed adaptive absorber 5 with a solid line. This indicates that the rotational speed variations are much greater for a conventional solution, while much lower rotational speed variations occur for a power transmission in an embodiment according to FIG. 3, in particular in critical rotational speed ranges.

REFERENCE NUMERALS AND DESIGNATIONS 1 force transmission device
2 damper assembly
3 damper
4 damper
5 rotational speed adaptive absorber
6 hydrodynamic component
7 lock up device for bridging hydrodynamic component
8 centrifugal force pendulum
9 centrifugal mass
9.1, 9.2, 9.11
9.12, 9.13, 9.14 inertial mass
10 inertial mass support device
11 support rollers
12 hub component
13 first clutch component
14 second clutch component
15 primary component
16 secondary component
17 torque transmission device
18 damping coupling device
19 elastic element
20 spring unit
21 primary component
22 secondary component
23 torque transmission device
24 damping coupling device
25 spring device
26 shoulder bolt
27 support roller
28 outer circumference
29 shaft
30 coupling
31 coupling
32 drive flange
33 drive discs
34 drive flange
35 drive discs
36 inner circumference
37 outer circumference
100 drive engine
101 output
E input
A output
P pump shell
T turbine shell
AR operating cavity
L stator shell
I first power path
II second power path
R rotation axis
S center of gravity
M center axis
N engine speed

What is claimed is:

1. A force transmission device for power transmission between a drive engine and an output, comprising:
   a damper assembly with first and second dampers, which can be connected in series; and
   a rotational speed adaptive absorber,
   wherein the rotational speed adaptive absorber is disposed between the first and second dampers at least in one force flow direction through a force transmission device,
   wherein each of the first and second dampers includes a primary component and a secondary component, and
   wherein the primary component of the second damper is connected torque proof with the secondary component of the first damper.

2. The force transmission device according to claim 1, comprising:
   a hydrodynamic component with at least one primary shell functioning as a pump shell (P) and a secondary shell functioning as a turbine shell (T), forming an operating cavity (AR) with one another,
   wherein the turbine shell (T) is connected at least indirectly torque proof with an output (A) of the force transmission device, and a coupling is performed through at least one of the first and second dampers of the damper assembly, and
   wherein the rotational speed adaptive absorber is connected at least indirectly torque proof with the secondary shell.

3. The force transmission device according to claim 2, wherein the rotational speed adaptive absorber is connected directly torque proof with the secondary shell (SR).

4. The force transmission device according to claim 2, wherein
the rotational speed adaptive absorber is connected with an element of the damper assembly, and
the element is connected torque proof with the secondary shell of the hydrodynamic component.

5. The force transmission device according to claim 4, wherein
the rotational speed adaptive absorber is connected with an element of a damper of the damper assembly, and
the element is connected directly torque proof with the secondary shell of the hydrodynamic component.

6. The force transmission device according to claim 4, wherein
the rotational speed adaptive absorber is coupled with an element of a damper,
the element of the damper is connected with an element of another damper of the damper assembly, and
the element of the another damper is directly connected with the secondary shell of the hydrodynamic component.

7. The force transmission device according to claim 2, wherein the hydrodynamic component is configured as a hydrodynamic speed-/torque converter comprising at least one stator shell (L).

8. The force transmission device according to claim 2, wherein the hydrodynamic component is configured as a hydrodynamic clutch without a stator shell (L).

9. The force transmission device according to claim 1, comprising:
a device for at least partially bridging the power transmission through the hydrodynamic component,
wherein the device is connected with an output (A) of the force transmission device through at least one damper of the damper assembly.

10. The force transmission device according to claim 1, wherein the damper assembly is disposed in a force flow between an input (E) and the output (A) in series with a hydrodynamic component and a device for bridging the hydrodynamic component.

11. The force transmission device according to claim 1, wherein the damper assembly is configured to be disposed in the force flow at least in series with a hydrodynamic component.

12. The force transmission device according to claim 11, wherein the respective other component, the device or the hydrodynamic component is coupled to the damper assembly through the connection of the first and second dampers.

13. The force transmission device according to claim 1, wherein the damper assembly is configured to be disposed in the force flow at least in series with a device for bridging a hydrodynamic component.

14. The force transmission device according to claim 1, wherein the first and second dampers of the damper assembly are configured as series or parallel dampers, comprising damper component assemblies.

15. The force transmission device according to claim 14, wherein the damper component assemblies of a damper are disposed on a common diameter.

16. The force transmission device according to claim 14, wherein the damper component assemblies of a damper are disposed on different diameters.

17. The force transmission device according to claim 1, wherein at least one of the first and second dampers is configured as a single damper.

18. The force transmission device according to claim 17, wherein the first and second dampers are disposed offset to one another in radial direction.

19. The force transmission device according to claim 1, wherein the first and second dampers are disposed offset relative to one another in axial direction.

20. The force transmission device according to claim 1, wherein the rotational speed adaptive absorber is configured as centrifugal force pendulum device, comprising at least one inertial mass support device and at least one inertial mass, which are supported at the inertial mass support device, movable relative thereto in radial direction, so that they can perform a pendulum type motion.

21. The force transmission device according to claim 1, wherein the rotational speed adaptive absorber is disposed and viewed in axial direction, spatially between an input (E) and the output (A) of the force transmission device, between the damper assembly and a hydrodynamic component.

22. The force transmission device according to claim 1, wherein the rotational speed adaptive absorber is disposed in axial direction spatially between the first and second dampers.

23. The force transmission device according to claim 1, wherein the rotational speed adaptive absorber is disposed in axial direction spatially between an input (E) and the output (A) of the force transmission device in front of the first and second dampers of the damper assembly.

24. The force transmission device according to claim 1, wherein inertial masses are disposed in radial direction in a portion of an extension of the damper assembly.

25. The force transmission device according to claim 1,
wherein each of the first and second dampers comprise at least one primary component and one secondary component, and
wherein the primary component or the secondary component are formed either by a flange element, or by drive disks disposed on both sides of the flange elements, are disposed coaxially relative to one another, are rotatable relative to one another in circumferential direction, and are coupled with one another through torque transmission devices and damping coupling devices.

26. The force transmission device according to claim 1, wherein components of the absorber form an integral unit with components of a connection element, in particular of a damper of the damper assembly or with a secondary shell, or are integrally configured therewith.

27. The force transmission device according to claim 1, wherein a damper of the damper assembly is configured as a mechanical damper.

28. The force transmission device according to claim 1, wherein a damper of the damper assembly is configured as a combined mechanical hydraulic damper.

29. The force transmission device according to claim 1,
wherein the rotational speed adaptive absorber is configured for an order of an excitation of a drive unit, in particular the drive engine, and
wherein a centrifugal force influence upon a particular inertial mass, which is reduced by a centrifugal oil pressure, is considered by configuring it for an order that is higher by >0.05 to 0.5 than without the centrifugal oil pressure.

* * * * *

(12) EX PARTE REEXAMINATION CERTIFICATE (11261st)
United States Patent
Degler et al.

(10) Number: US 8,161,739 C1
(45) Certificate Issued: Mar. 13, 2018

(54) FORCE TRANSMISSION DEVICE IN PARTICULAR FOR POWER TRANSMISSION BETWEEN A DRIVE ENGINE AND AN OUTPUT

(75) Inventors: Mario Degler, Baden-Baden (DE); Thorsten Krause, Bühl (DE); Kai Schenck, Offenburg (DE); Markus Werner, Bühl (DE); Dominique Engelmann, Offendorf (FR)

(73) Assignee: SCHAEFFLER TECHNOLOGIES AG & CO. KG

Reexamination Request:
No. 90/013,758, Jun. 1, 2016

Reexamination Certificate for:
Patent No.: 8,161,739
Issued: Apr. 24, 2012
Appl. No.: 12/800,937
Filed: May 26, 2010

Related U.S. Application Data

(63) Continuation of application No. PCT/DE2008/001900, filed on Nov. 17, 2008.

(30) Foreign Application Priority Data

Nov. 29, 2007 (DE) .......................... 10 2007 057 448

(51) Int. Cl.
*F16D 3/14* (2006.01)
*F16F 15/10* (2006.01)
*F16F 15/14* (2006.01)
*F16H 45/02* (2006.01)

(52) U.S. Cl.
CPC ...... *F16F 15/145* (2013.01); *F16H 2045/021* (2013.01); *F16H 2045/0231* (2013.01); *F16H 2045/0247* (2013.01); *F16H 2045/0263* (2013.01); *F16H 2045/0284* (2013.01); *Y10T 74/2121* (2015.01); *Y10T 74/2131* (2015.01)

(58) Field of Classification Search
None
See application file for complete search history.

(56) References Cited

To view the complete listing of prior art documents cited during the proceeding for Reexamination Control Number 90/013,758, please refer to the USPTO's public Patent Application Information Retrieval (PAIR) system under the Display References tab.

*Primary Examiner* — Robert M Fetsuga

(57) ABSTRACT

A force transmission device, in particular or power transmission between a drive engine and an output, comprising a damper assembly with at least two dampers, which can be connected in series, and a rotational speed adaptive absorber, wherein the rotational speed adaptive tuned mass damper is disposed between the dampers at least in one force flow direction through the force transmission device.

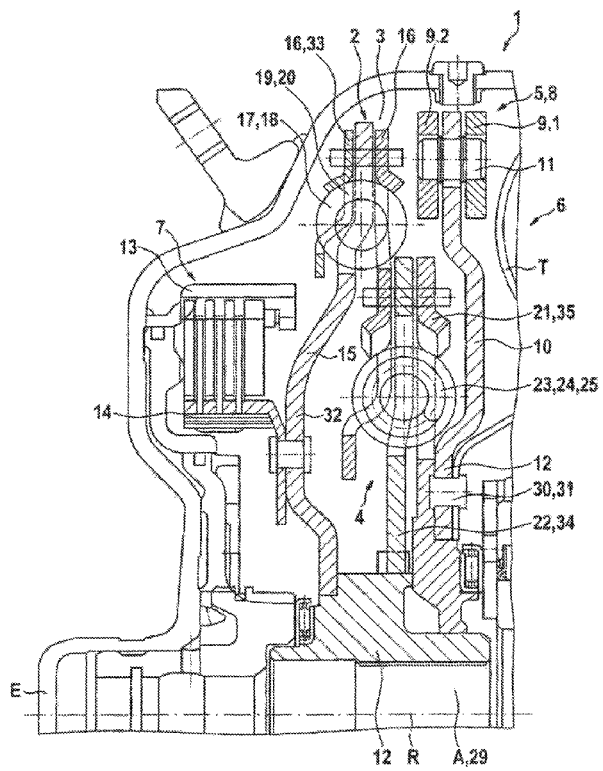

EX PARTE REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1-24 and 26-29 are cancelled.

Claim 25 is determined to be patentable as amended.

25. [The force transmission device according to claim 1, wherein each of the first and second dampers comprise at least one primary component and one secondary component, and] *A force transmission device for power transmission between a drive engine and an output, comprising:*
  *a damper assembly that includes first and second dampers connected in series; and*
  *a rotational speed adaptive absorber,*
  *wherein the rotational speed adaptive absorber is disposed between the first and second dampers at least in one force flow direction through the force transmission device,*
  *wherein a resonance frequency of the rotational speed adaptive absorber is proportional to a rotational speed of the drive engine,*
  *wherein each of the first and second dampers includes a primary component and a secondary component, and*
  *wherein the primary component of the second damper is connected torque proof with the secondary component of the first damper,*
  wherein the primary component [or the secondary component are formed either by a flange element, or by drive disks disposed on both sides of the flange elements,] *of the first damper is formed by a first flange element,*
  *wherein the secondary component of the first damper is formed by first drive disks, disposed such that the first flange element is between the first drive disks,*
  *wherein the primary component of the second damper is formed by second drive disks,*
  *wherein the secondary component of the second damper is formed by a second flange element disposed between the second drive disks,*
  *wherein the primary component and the secondary component of the first damper* are disposed coaxially relative to one another, are rotatable relative to one another in circumferential direction, and are coupled with one another through torque transmission devices and damping coupling devices, *and*
  *wherein the primary component and the secondary component of the second damper are disposed coaxially relative to one another, are rotatable relative to one another in circumferential direction, and are coupled with one another through torque transmission devices and damping coupling devices.*

* * * * *